July 20, 1943.   G. P. BARROTT ET AL   2,324,813
LINEAR-DIMENSION GAUGE OR COMPARATOR
Filed May 27, 1941

Inventors,
G. P. Barrott
& H. F. Plaut
by Glascock Downing & Seebold
Attys

Patented July 20, 1943

2,324,813

UNITED STATES PATENT OFFICE 2,324,813

LINEAR-DIMENSION GAUGE OR COMPARATOR

George Primrose Barrott and Hermann Franz Plaut, Mitcham Junction, England, assignors to Precision Grinding Limited, Mitcham Junction, England Application May 27, 1941, Serial No. 395,489
In Great Britain June 18, 1940

1 Claim. (Cl. 33—169)

This invention relates to measuring instruments of the kind known as height and depth gauges and used for measuring or comparing the vertical dimensions of objects such as work pieces produced in manufacturing operations, or for scribing horizontal lines on objects at desired vertical positions relatively to a base, the purpose of the invention being to provide an improved optical instrument of this kind.

Figure 1:
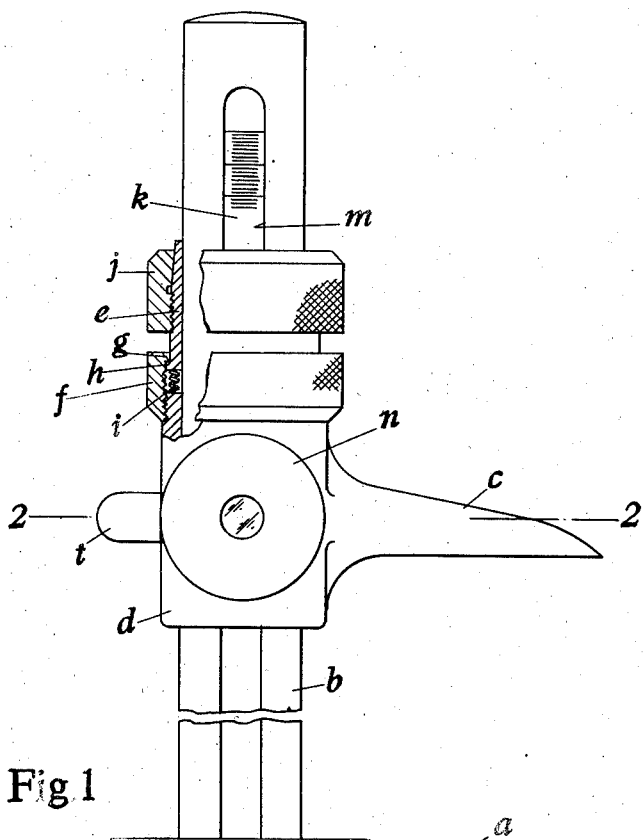
Figure 2:
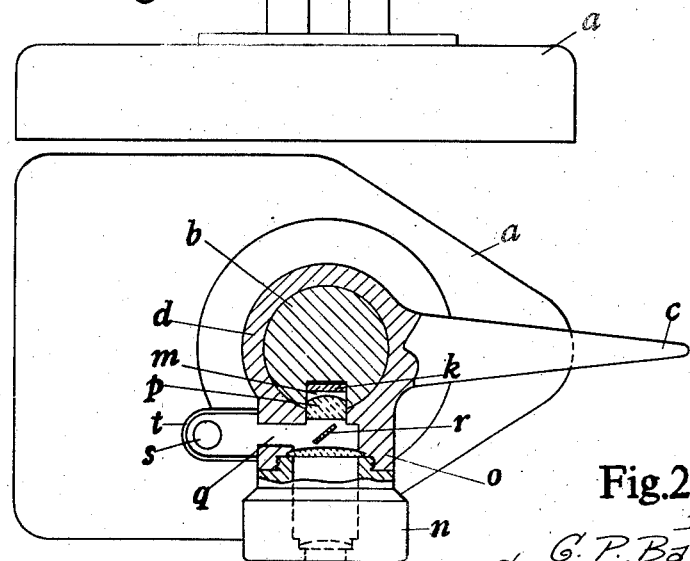

In the accompanying sheet of explanatory drawings, Figure 1 is a part sectional elevation of a measuring instrument constructed in accordance with the invention, and Figure 2 is a section on the line 2—2 of Figure 1.

In carrying the invention into effect as shown, we form or secure on any convenient base $a$ a vertical pillar $b$ of circular or any other convenient cross section and of any convenient length. On the pillar $b$ is slidably mounted a laterally projecting arm $c$ which at its inner end is formed by a sleeve $d$ surrounding the pillar. This arm may be adapted to serve as a caliper member which can be brought into contact with the upper surface of the object to be measured, and/or adapted at its outer end to serve as a scriber, and moreover it may be adapted to carry a micrometer gauge of the dial or any suitable type. When it is required to use the instrument as a depth gauge the arm may be provided with a caliper member adapted to extend through or at one side of the base. For securing the arm $c$ in any desired position on the pillar $b$ we employ a member in the form of a second and separate sleeve $e$ which is slidably mounted on the pillar above the first sleeve $d$. The second sleeve $e$ is connected to the first sleeve $d$ by a coupling in the form of a rotatable collar $f$ which surrounds the adjacent ends of the two sleeves, the lower end of the collar having a fine-adjustment screw thread connection with the upper end of the first sleeve, and the upper end of the collar being formed with an internal shoulder $g$ which bears against an external shoulder $h$ on the lower end of the second sleeve under the action of a compression spring or springs $i$ arranged between the adjacent ends of the sleeves. Also the upper end portion of the second sleeve $e$ is made to a tapered conical form, and is sufficiently resilient to be contracted into tight contact with the pillar $b$ by a complementary upper portion of another rotatable collar $j$ which surrounds this sleeve at a position above the first collar $f$, the lower end of the second collar being in screw thread connection with an intermediate portion of the second sleeve. To facilitate manipulation of the collars $f$, $j$, their outer surfaces may be knurled or serrated.

Coarse adjustment of the arm $c$ is effected by first releasing the second collar $j$ sufficiently to permit movement of the second sleeve $e$, and then moving this collar and sleeve together with the first collar $f$ and the arm to approximately the required position on the pillar $b$. After securing the second sleeve $e$ by manipulating the second collar $j$ fine adjustment of the arm $c$ is effected by manipulating the first collar $f$ so as to move the first sleeve $d$ on the pillar $b$ relatively to the second sleeve.

At one side the pillar $b$ carries a longitudinally arranged scale $k$ which is preferably mounted in a longitudinal slot $m$ in the pillar. Situated between the outer face of the scale $k$ and an optical eye-piece $n$ secured to the outer end of a hollow boss $o$ on the first sleeve $d$ is a vernier graticule $p$, the latter being carried by this sleeve and extending into the slot $m$ in the pillar $b$, and the arrangement being such that the scale and graticule can be viewed through the eye-piece. Both the scale $k$ and graticule $p$ are formed photographically or by etching on glass or other transparent or translucent material and provision is made for illuminating them. Preferably the provision for illumination consists of a lateral hole $q$ formed in the hollow boss $o$, and a transparent reflector $r$ arranged within the boss to deflect light passing through the hole on to the graticule and scale, this light being either natural or artificial. In the latter case the light may be derived from a small electric lamp bulb $s$ arranged in a reflecting housing $t$ at the outer end of the hole $q$ in the boss $o$. But in either case the base of the slot $m$ in the pillar $b$ is painted white so as to provide the scale $k$ with a white background.

By this invention we are able to provide an instrument of the kind above specified in a very simple and convenient form which is capable of being easily and economically produced and which enables a higher order of accuracy of measurement to be obtained than is possible with an instrument of usual form fitted with an ordinary engraved scale and vernier.

The invention is not limited to the example above described as subordinate constructional details may be varied to suit different requirements.

Having thus described our invention what we claim as new and desired to secure by Letters Patent is:

A measuring instrument of the kind specified, comprising the combination of a vertical pillar, an arm slidably adjustable on the pillar, the inner end of the arm being formed by a sleeve on the pillar, a scale mounted longitudinally on one side of the pillar, a graticule mounted on the arm and in association with the scale, an eye piece on the arm for viewing the scale and graticule, another sleeve slidably mounted on the pillar above the first mentioned sleeve and having a contractible upper end portion, at least one spring arranged between the adjacent ends of the two sleeves, a rotatable member surrounding and adjustably interconnecting the adjacent ends of the two sleeves, and another rotatable member surrounding the second-mentioned sleeve and adapted to contract the upper end portion of this sleeve into tight contact with the pillar.

GEORGE PRIMROSE BARROTT.
HERMANN FRANZ PLAUT.